US012774767B1

(12) United States Patent
Lymberopoulos et al.

(10) Patent No.: US 12,774,767 B1
(45) Date of Patent: Oct. 27, 2026

(54) SEAL RING FOR USE IN FACE-TO-FACE FLUID CONDUIT SYSTEMS

(71) Applicant: SAFOCO, INC., Houston, TX (US)

(72) Inventors: David Lymberopoulos, Houston, TX (US); James Eric Amberg, Cleveland, TX (US)

(73) Assignee: SAFOCO, INC., Houston, TX (US)

( * ) Notice: Subject to any disclaimer, the term of this patent is extended or adjusted under 35 U.S.C. 154(b) by 0 days.

(21) Appl. No.: 19/200,403

(22) Filed: May 6, 2025

(51) Int. Cl.
*F16L 23/22* (2006.01)
*F16L 23/16* (2006.01)

(52) U.S. Cl.
CPC ............. *F16L 23/22* (2013.01); *F16L 23/162* (2013.01)

(58) Field of Classification Search
CPC ......... F16J 15/102; F16J 15/104; F16J 15/128; F16J 15/125; F16J 15/121; F16J 15/12; F16L 23/16; F16L 23/162; F16L 23/18; F16L 23/22; F16L 23/20; F16L 17/06; F16L 17/067; F16L 17/08
See application file for complete search history.

(56) References Cited

U.S. PATENT DOCUMENTS 3,918,725 A * 11/1975 Dryer ...................... F16L 23/18 277/612
4,441,725 A 4/1984 Bailey
5,863,078 A 1/1999 Ball
11,131,385 B2 9/2021 Zitting et al.
11,767,917 B2 9/2023 Zitting et al.
2007/0024007 A1* 2/2007 Putch ...................... F16L 17/06 277/314
2024/0318723 A1 9/2024 Zitting

FOREIGN PATENT DOCUMENTS

GB 1441207 A 6/1976

OTHER PUBLICATIONS

OptiSeal®, CDI Products, Retrieved from https://www.cdiproducts.com/solutions/product-brands/optiseal on Jul. 29, 2025, 6 pages.
Parker Polypak Seals, United Seal & Rubber Co. Inc., Retrieved from https://unitedseal.com/portfolio/parker-polypak-seals/ on Jul. 29, 2025, 4 pages.
HellCat Super Duty Seal Assembly #1100, Innovators West, Inc., Retrieved from https://innovatorswest.com/product/1100-oil-seal/ on Jul. 29, 2025, 2 pages.
International Search Report and Written Opinion for Application No. PCT/US2026/018221 dated May 29, 2026, 12 pages.

* cited by examiner

*Primary Examiner* — Aaron M Dunwoody
(74) *Attorney, Agent, or Firm* — Patterson + Sheridan, LLP

(57) ABSTRACT

A seal ring for use in a face-to-face fluid conduit system. The seal ring includes a backing ring, and a first sealing body coupled to an inner radial surface of the backing ring. The first sealing body includes a first portion extending above the backing ring, and a second portion extending below the backing ring. The fluid conduit system further includes a first fluid conduit including a first mating surface and a first groove disposed in the first mating surface, and a second fluid conduit including a second mating surface and a second groove disposed in the second mating surface. The first mating surface abuts the second mating surface, and the seal ring is disposed in the first groove and the second groove.

18 Claims, 4 Drawing Sheets

SEAL RING FOR USE IN FACE-TO-FACE FLUID CONDUIT SYSTEMS

BACKGROUND

Field

Embodiments disclosed herein generally relate to a seal ring for use in the fluid conduit systems. In particular, embodiments disclosed herein relate to a seal ring for use in face-to-face seals in fluid conduit systems.

Description of the Related Art

Fluid systems are used to allow for fluid connections. Some fluid conduit systems, such as those used for well treatments in the oil and gas industry, are used temporarily in a series of different locations. These fluid conduit systems are successively assembled at a work site, used to convey fluids, disassembled, transported to another site, reassembled, and so on. It is desirable for the connections of such systems to be robust and reliable. Therefore, there is an ongoing need for improvements in fluid conduit systems.

SUMMARY

In one embodiment, a seal ring for use in a face-to-face fluid conduit system comprises a backing ring, and a first sealing body coupled to an inner radial surface of the backing ring. The first sealing body comprises a first portion extending above the backing ring, and a second portion extending below the backing ring.

In one embodiment, a fluid conduit system comprises a first fluid conduit including a first mating surface and a first groove disposed in the first mating surface, a second fluid conduit including a second mating surface and a second groove disposed in the second mating surface, wherein the first mating surface abuts the second mating surface, and a seal ring disposed in the first groove and the second groove. The seal ring comprises a backing ring and a first sealing body coupled to an inner radial surface of the backing ring. The first sealing body comprises a first portion extending above the backing ring, and a second portion extending below the backing ring.

BRIEF DESCRIPTION OF THE DRAWINGS

So that the manner in which the above-recited features of the disclosure can be understood in detail, a more particular description of the disclosure, briefly summaries above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

The disclosure contemplates that terms such as "couples," "coupling," "couple," and "coupled" may include but are not limited to welding, interference fitting, magnetic coupling, and/or fastening such as by using bolts, threaded connections, pins, clips, and/or screws. The disclosure contemplates that terms such as "couples," "coupling," "couple," and "coupled" may include but are not limited to integrally forming. The disclosure contemplates that terms such as "couples," "coupling," "couple," and "coupled" may include but are not limited to direct coupling and/or indirect coupling, such as indirect coupling through components such as links.

Aspects of the present disclosure provide for a sealing ring for use in face-to-face seals in fluid conduit systems.

Figure 1:
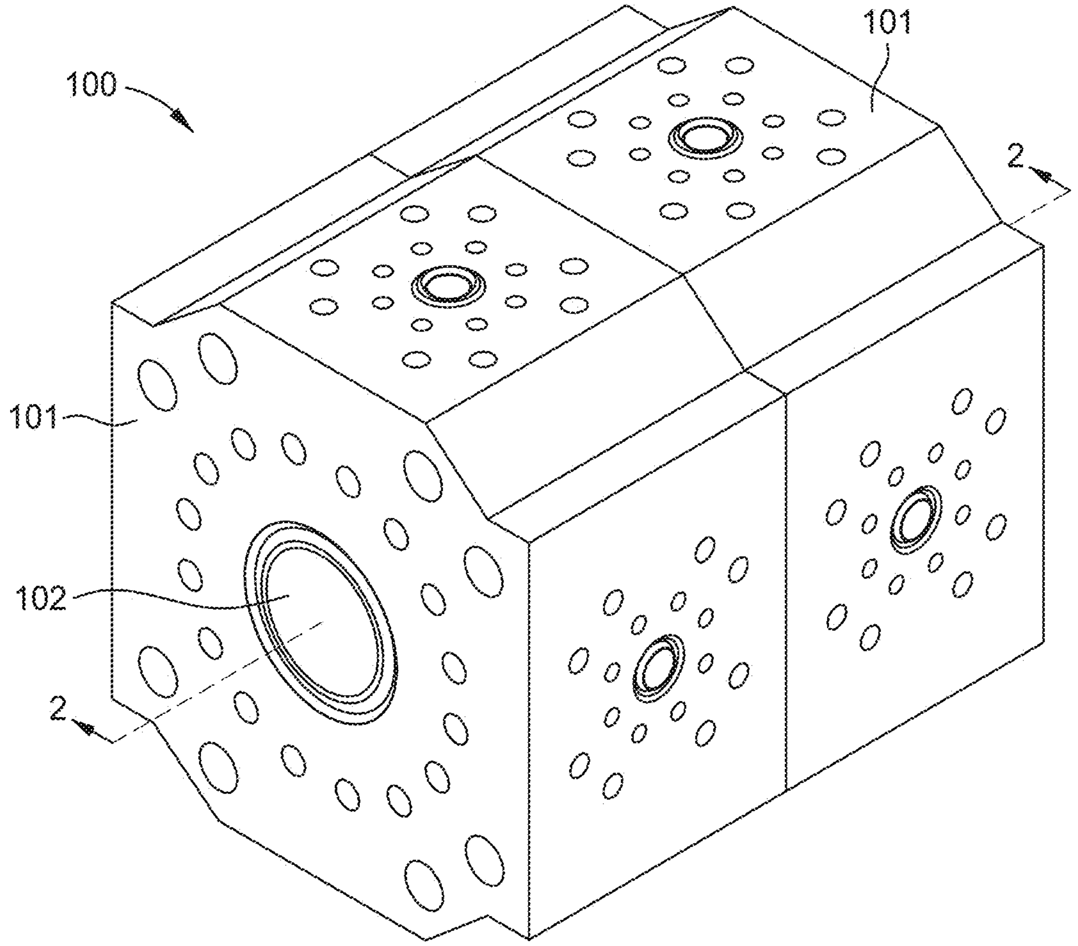
FIG. 1 illustrates an isometric view of a fluid conduit system, according to one or more embodiments.

FIG. 1 illustrates an isometric view of a fluid conduit system 100. The fluid conduit system 100 includes a plurality of fluid conduits 101. The fluid conduits 101 include one or more bores 102. The one or more bores 102 are supplied with a fluid and are configured to direct the fluid between the plurality of fluid conduits 101.

Figure 2:
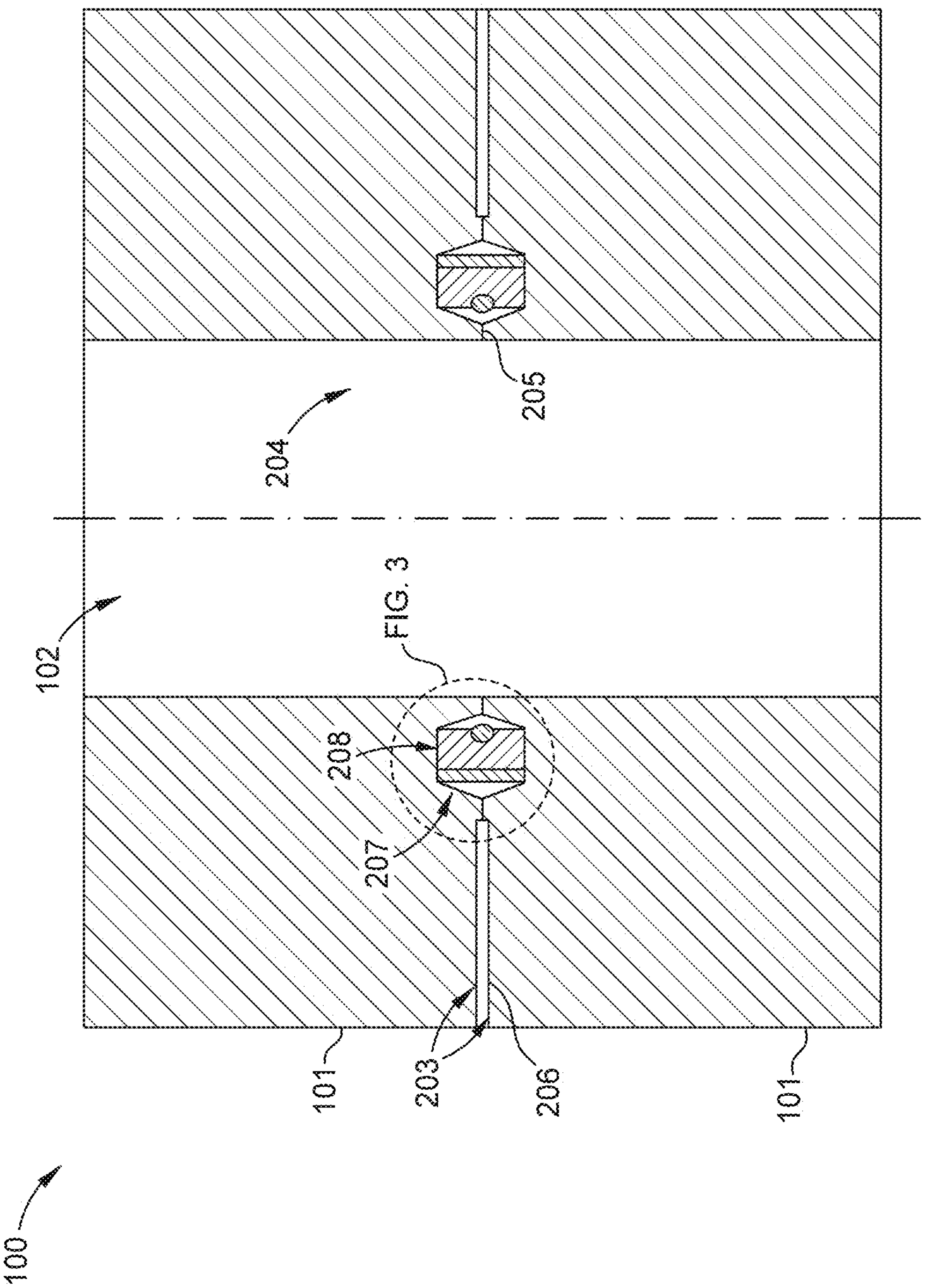
FIG. 2 illustrates a cross-sectional view of the fluid conduit system of FIG. 1 taken at line 2-2, according to one or more embodiments.

FIG. 2 illustrates a cross-sectional view of the fluid conduit system 100 of FIG. 1 taken at line 2-2. The fluid conduits 101 further include mating surfaces 203. The mating surfaces 203 of each fluid conduit 101 are used to mate each of the fluid conduits 101 to another fluid conduit 101 or to another component in the system (e.g., a pump, a valve, or any fluid source or component that receives fluid). For example, in some embodiments, the fluid conduit 101 may be face-to-face conduits such that the face of one fluid conduit 101 is configured to mate to the face of another fluid conduit 101. However, in some embodiments, the fluid conduit system 100 may include fluid conduits 101 that include flange-to-flange sealing or face-to-flange sealing. The mating surface 203 surrounds the bore 102 such that the mating surface 103 acts to seal a continuous flow path 204 created by the bores 102 of mated fluid conduits 101.

In some embodiments, such as the illustrated embodiment, the mating surfaces 203 include a first mating surface portion 205 and a second mating surface portion 206. As illustrated, the first mating surface portion 205 is adjacent to the bore 102 of the fluid conduit 101 (e.g. includes the portion of the mating surface 203 at the most inner-radial point of the mating surface 203). The first mating surface portion 205 is raised from the second mating surface portion 206. In some embodiments, when assembled, the first mating surface portion 205 of a first fluid conduit 101 is in contact with (e.g. abuts) the first mating surface portion 205 of a second fluid conduit 101. In such instances, the conduits 101 are said to be at zero-to-zero. When at zero-to-zero, the first mating surface portions 205 may assist in sealing the conduits 101 together.

The first mating surface portion 205 includes a seal groove 207. The seal groove 207 circumscribes the bore 102 of the fluid conduit 101. The seal groove 207 is shaped to house an annular seal, such seal ring 208. The seal ring 208 is annular such that it surrounds the bores 102 of the mated fluid conduits 101. In some embodiments, the seal ring 208 is axisymmetric about the center axis of the bores 102 of the mated fluid conduits 101.

Figure 3:
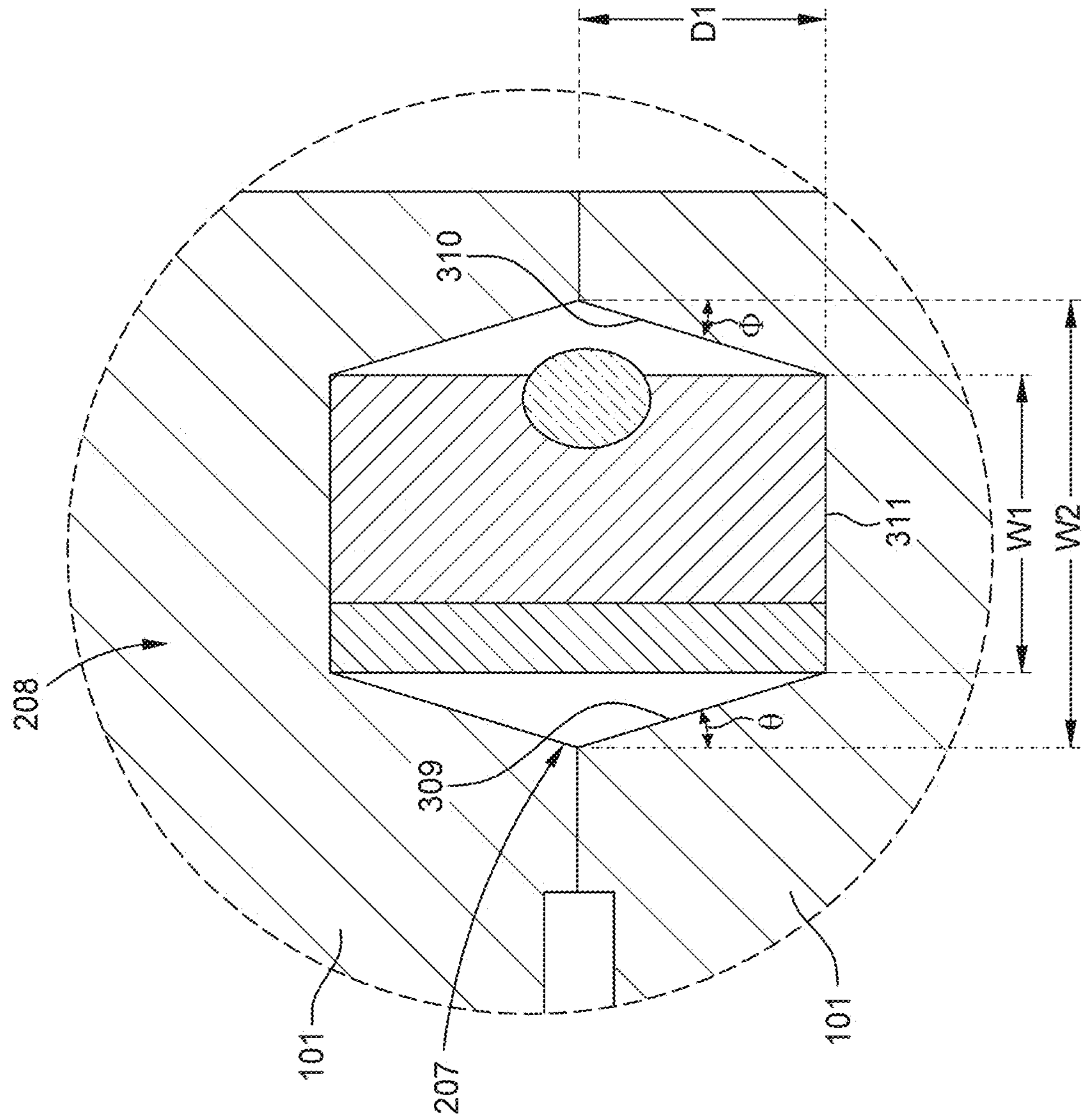
FIG. 3 illustrates a detailed view of a seal ring of the fluid conduit system of FIGS. 1 and 2, according to one or more embodiments.
Figure 4:
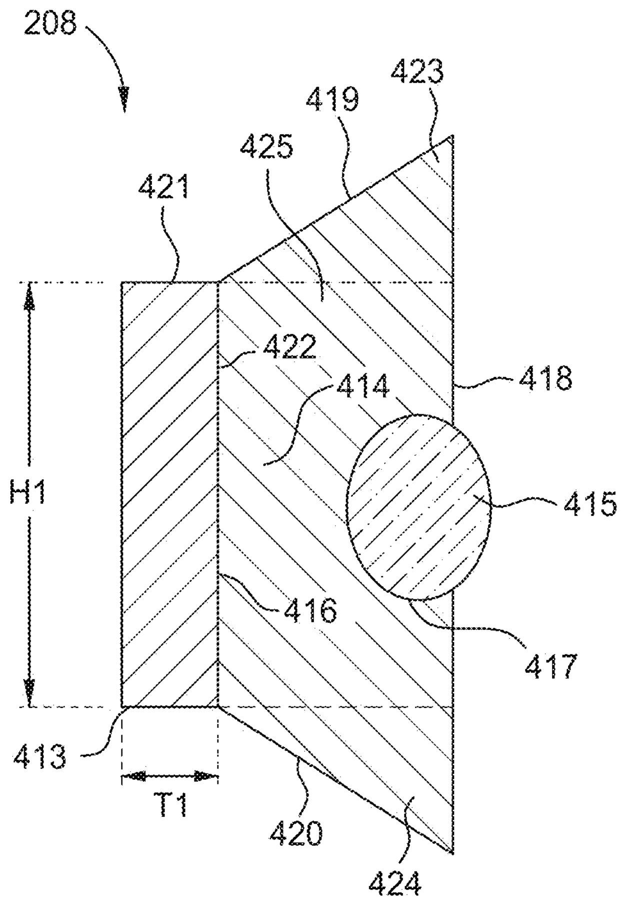
FIG. 4 illustrates a cross-sectional view of the seal ring of FIG. 3 in an unassembled state, according to one or more embodiments.

FIGS. 3 and 4 illustrate detailed cross-sectional views of the seal ring 208. FIG. 3 illustrates a detailed cross-sectional view of the seal ring 208 disposed in the seal groove 207 of FIG. 2. FIG. 4 illustrates a detailed cross-sectional view of the seal ring 208 in an unsealed state (e.g., not assembled between fluid conduits 101).

The seal groove 207 includes a first sidewall 309 (the outer diameter sidewall), a second sidewall 310 (the inner diameter sidewall), and a base surface 311. The seal groove 207 includes a depth D1 (e.g. the distance between the base surface 311 of the seal groove 207 and the first mating surface portion 205). In some embodiments, one or more of the first sidewall 309 and the second sidewall 310 are tapered. As a non-limiting example, in the illustrated embodiment, the first sidewall 309 and the second sidewall 310 are tapered inward towards a center of the base surface 311 of the seal groove 207. In some embodiments, the first sidewall 309 may have a taper angle Θ and the second sidewall 310 may have a taper angle Φ. In some embodiments, the first sidewall 309 and the second sidewall 310 are mirror images of one another (i.e., Θ and Φ are equal). In some embodiments, the seal groove 207 has a varying width (e.g., the distance between the first sidewall 309 and the second sidewall 310). As a non-limiting example, in the illustrated embodiment, the seal groove 207 has at least a first width W1 at its inner-most radial point (e.g., the width of the base surface 311) and a second width W2 at its outer-most radial point (e.g., the width of the seal groove 207 at the first mating surface portion 205).

The seal ring 208 includes a backing ring 413, a first sealing body 414, and a second sealing body 415. The backing ring 413 is a rigid or semi-rigid annular body. The backing ring includes a rectangular cross section and has a thickness Tl and a height H1. The backing ring 413 is made of a material that is more rigid than the first sealing body 414. As a non-limiting example, in some embodiments, the backing ring 413 is made of metal. In some embodiments, the backing ring 413 is made of steel.

The first sealing body 414 is coupled to the backing ring 413 at its outer-most radial surface 416. In one or more embodiments, the first sealing body 414 is extruded onto the backing ring 413. In some embodiments, the first sealing body 414 is injection molded. The first sealing body 414 includes a groove 417 in its inner-most radial surface 418 for housing the second sealing body 415. The first sealing body 414 includes a top portion 423 including a top surface 419, a bottom portion 424 including a bottom surface 420, and a middle portion 425. In some embodiments, the top portion 423 and bottom portion 424 are separate components coupled to the middle portion 425. In some embodiments, the top portion 423 and the bottom portion 424 are made of a different material than the middle portion 425. In some embodiments, the top portion 423, bottom portion 424, and middle portion 425 are monolithic.

In some embodiments, the first sealing body 414 is symmetric about a horizontal centerline. Accordingly, any description with respect to the top portion 423 and the top surface 419 is similarly applicable to the bottom portion 424 and the bottom surface 420 and may not be repeated, herein.

The top surface 419 extends from the outer-most radial surface 416 to the inner-most radial surface 418. In some embodiments, the top surface 419 is coupled to a vertex where a top surface 421 of the backing ring 413 intersects with an inner-most radial surface 422 of the backing ring 413. Accordingly, the length of the outer-most radial surface 416 of the first sealing body 414 may be the same as the backing ring 413 (i.e., H1). In some embodiments, the top surface 419 is coupled to a point along the inner-most radial surface 422 of the backing ring 413 such that the backing ring 413 extends above and below the outer-most radial surface 416 of the first sealing body 414. Accordingly, the length of the outer-most radial surface 416 of the first sealing body 414 may be less than the length of the backing ring 413 (i.e., H1).

In the unsealed state, as illustrated in FIG. 4, the top surface 419 extend outward from the point where the first sealing body 414 meets the backing ring 413 (defining the top portion 423). The top surface 419 extends outward from the point where the first sealing body 414 meets the backing ring 413 at an angle α. In some embodiments, a is in the range of about 0 degrees to about 60 degrees, such as about 15 degrees to about 45 degrees, such as about 30 degrees.

The seal ring 208 may further include a second sealing body 415. In some embodiments, the seal ring 208 does not include a second sealing body 415. The second sealing body 415 is disposed in the groove 417 in the first sealing body 414. In one or more embodiments, the second sealing body 415 is sized such that at least a portion of the second sealing body 415 extends from the groove 417 past the inner-most radial surface 418 of the first sealing body 414.

In some embodiments, the second sealing body 415 is an elastomeric material. In such embodiments, the second sealing body 415 may be an O-ring. In some embodiments, the second sealing body 415 is less rigid than the first sealing body 414. Accordingly, in some embodiments, the second sealing body 415 is less rigid than the first sealing body 414 which is less rigid than the backing ring 413. In some embodiments, the second sealing body 415 is made of metal.

Referring back to FIG. 3, in the installed state, the sealing ring 208 is positioned between the seal groove 207 of a first (illustrated as top) fluid conduit 101 and the groove of a second (illustrated as bottom) fluid conduit 101. In some embodiments, the height H1 of the backing ring 413 is twice the depth D1 such that the backing ring seals against the base surfaces 311 of each of the seal grooves 207. In some embodiments, the height H1 of the backing ring 413 is less than twice the depth D1 such that the backing ring 413 seals against the first sidewalls 309 of the seal grooves 207. In any case, the backing ring 413 seals against at least a portion of the seal grooves 207 of the fluid conduits 101.

Further, in the installed state, the second sealing body 415 acts to push the top portion 423 and bottom portion 424 of the first sealing body 414 outwards to compress and seal against the seal grooves 207. The top portion 423 compresses and seals against the second sidewall 310 of the seal groove 207 of the upper fluid conduit 101. The bottom portion 424 compresses and seals against the second sidewall 310 of the seal groove 207 of the bottom fluid conduit 101. The compression of the top portion 423 and the bottom portion 424 also compress and seal against the second sealing body 415.

According to one mode of operation, when fluid in the bores 102 of the fluid conduit 101 is at a low pressure, the second sealing body 415 forcing the top portion 423 and the bottom portion 424 outward is sufficient to seal the bore 102. The fluid in the bores 102 may be at low pressure, for example, when flooding one or more fluid lines that are in fluid communication with the fluid conduit 100 before conducting a hydraulic fracturing operation, as well as during marginal production well flow. At higher pressures, the pressure causes the top portion 423 and the bottom portion 424 are forced outward by the pressure from the bores 102. The fluid in the bores 102 may be at high pressure, for example, when reaching treating pressure while conducting a hydraulic fracturing operation, as well as during full production well flow. As the top portion 423 and the bottom portion 424 are forced outwards, they compress and seal against at least a portion of the seal grooves 207. Similarly, at higher pressures, the backing ring 413 acts not only as a secondary seal, but as an anti-extrusion component that prevents the first sealing body 414 from extruding to fill the seal groove 207 or escape the seal groove 207 such that the seal between the first sealing body 414 and the seal grooves 207 is lost.

Any one or more components of the fluid conduit system 100 may be integrally formed together, directly coupled together, and/or indirectly coupled together and are not limited to the specific arrangement of components illustrated in FIGS. 1-4. Any one or more of the components or embodiments of the fluid conduit system 100 may be combined in whole or part with any other components or embodiments of the fluid conduit system 100.

It will be appreciated by those skilled in the art that the preceding embodiments are exemplary and not limiting. It is intended that all modifications, permutations, enhancements, equivalents, and improvements thereto that are apparent to those skilled in the art upon a reading of the specification and a study of the drawings are included within the scope of the disclosure. It is therefore intended that the following appended claims may include all such modifications, permutations, enhancements, equivalents, and improvements. The disclosure also contemplates that one or more aspects of the embodiments described herein may be substituted in for one or more of the other aspects described. The scope of the disclosure is determined by the claims that follow.

We claim:

1. A seal ring for use in a face-to-face fluid conduit system, comprising:
- a backing ring; and
- a first sealing body, wherein an outer radial surface of the first sealing body is coupled to an inner radial surface of the backing ring, the first sealing body comprising:
  - a first portion extending above the backing ring; and
  - a second portion extending below the backing ring, wherein a height of the backing ring is greater than a height of the outer radial surface of the first sealing body.

2. The seal ring of claim 1, further comprising a groove disposed in an inner radial surface of the first sealing body, and a second sealing body disposed in the groove.

3. The seal ring of claim 2, wherein the backing ring is more rigid than the first sealing body and the second sealing body.

4. The seal ring of claim 3, wherein the first sealing body is more rigid than the second sealing body.

5. The seal ring of claim 2, wherein the second sealing body comprises an O-ring.

6. The seal ring of claim 1, wherein the backing ring comprises metal and the first sealing body comprises an elastomer.

7. The seal ring of claim 1, wherein the first sealing body is monolithic.

8. A fluid conduit system, comprising:
- a first fluid conduit including a first mating surface and a first groove disposed in the first mating surface;
- a second fluid conduit including a second mating surface and a second groove disposed in the second mating surface, wherein the first mating surface abuts the second mating surface; and
- a seal ring disposed in the first groove and the second groove, the seal ring comprising:
  - a backing ring;
  - a first sealing body coupled to an inner radial surface of the backing ring, the first sealing body comprising:
    - a groove disposed in an inner radial surface of the first sealing body;
    - a first portion extending above the backing ring; and
    - a second portion extending below the backing ring; and
  - a second sealing body disposed in the groove of the first sealing body, wherein the backing ring is more rigid than the first sealing body and the second sealing body.

9. The system of claim 8, wherein the first sealing body is more rigid than the second sealing body.

10. The system of claim 8, wherein the second sealing body comprises an O-ring.

11. The system of claim 8, wherein the seal ring seals on an inner diameter sidewall of the first groove and seals on an inner diameter sidewall of the second groove.

12. The system of claim 8, wherein the backing ring comprises metal and the first sealing body comprises an elastomer.

13. The system of claim 8, wherein the first sealing body is monolithic.

14. The system of claim 8, wherein the first sealing body is coupled to the entirety of the inner radial surface of the backing ring.

15. The system of claim 8, wherein an outer radial surface of the first sealing body is coupled to the inner radial surface of the backing ring, and wherein a height of the backing ring is greater than a height of the outer radial surface of the first sealing body.

16. The system of claim 8, wherein the first sealing body comprises a third portion disposed between the first portion and the second portion, and wherein the third portion comprises a material different from the first portion and the second portion.

17. A fluid conduit system, comprising:
- a first fluid conduit including a first mating surface and a first groove disposed in the first mating surface;
- a second fluid conduit including a second mating surface and a second groove disposed in the second mating surface, wherein the first mating surface abuts the second mating surface; and
- a seal ring disposed in the first groove and the second groove, the seal ring comprising:
  - a backing ring; and
  - a first sealing body, wherein an outer radial surface of the first sealing body is coupled to an inner radial surface of the backing ring, the first sealing body comprising:
    - a first portion extending above the backing ring; and
    - a second portion extending below the backing ring, wherein a height of the backing ring is greater than a height of the outer radial surface of the first sealing body.

18. A fluid conduit system, comprising:
- a first fluid conduit including a first mating surface and a first groove disposed in the first mating surface;
- a second fluid conduit including a second mating surface and a second groove disposed in the second mating surface, wherein the first mating surface abuts the second mating surface; and a seal ring disposed in the first groove and the second groove, the seal ring comprising:
a backing ring; and
a first sealing body coupled to an inner radial surface of the backing ring, the first sealing body comprising:
a first portion extending above the backing ring;
a second portion extending below the backing ring; and
a third portion disposed between the first portion and the second portion, wherein the third portion comprises a material different from the first portion and the second portion.

* * * * *